Sept. 12, 1944.  S. P. WICHTERMAN  2,357,986

VALVE MECHANISM

Filed June 3, 1942  2 Sheets-Sheet 2

Inventor:
SAMUEL P. WICHTERMAN,
by: John E. Jackson
his Attorney.

Patented Sept. 12, 1944

2,357,986

UNITED STATES PATENT OFFICE 2,357,986

VALVE MECHANISM

Samuel P. Wichterman, Donora, Pa.

Application June 3, 1942, Serial No. 445,662

3 Claims. (Cl. 121—46.5)

This invention relates generally to control mechanism for manipulating means employed on slabbing and blooming rolling mills. The invention relates more particularly to improvements in the control means for high pressure hydraulic actuating means for manipulating mechanism, which mechanism usually employs a hydraulic lifting cylinder located under the roll table near the rolls on the entering side of the mill, such manipulators usually being provided on all reversing blooming mills for turning the ingot as desired between the pieces, for moving the piece from groove to groove, or for straightening it as it enters the passes at the mill, when such straightening is necessary.

One of the objects of the present invention is to provide a high pressure control means of extremely simple construction, having a minimum number of relatively movable parts, in which the likelihood of leakage and shock is reduced to a minimum by providing a construction which eliminates the necessity for any projecting or extending parts from the main control piston and also so disposes the parts of the control valve that the pressures effective under the different conditions of operation are balanced as far as possible, so that the necessity for the use of glands or packing between a casing and a part, such as a piston or connecting rod usually provided to transmit motion, is entirely eliminated, thus minimizing or completely avoiding the likelihood of leakage from stuffing and packing boxes, such as is usually encountered where the same are employed, particularly, in connection with high pressure hydraulic systems.

At the present time, where hydraulic actuating means are employed for operating and controlling the manipulator mechanism of a blooming mills, there is employed a fairly complicated system having a plurality of separate units, such as an Ahlene jack and Aiken valve, a pilot valve, and two single acting cylinders, all of which are so disposed and connected by various link levers and plunger connections so as to ultimately effect control of the movement of the manipulator in either direction, or to maintain it in a normal or central position. Of course, such a system presented numerous relatively movable parts suitably interconnected, and also necessitated the use of glands and packing boxes at the points where plungers or parts extended through the case, where such relatively movable parts at their inner portions were in communication with the liquid. Such a system employing a plurality of interconnected control units necessitated the use of as many as seven moving external parts between the pilot valve and the main valve. In contrast to such an arrangement heretofore employed, the present main control valve, whose movement is in turn controlled by a single pilot valve, is entirely enclosed, and has no external moving parts, so that when the parts are assembled and bolted together, the valve control means directly controlling the movement of the manipulator actuating means has, for practical purposes, all the simplicity of a single sealed, self-contained unit, presenting no externally projecting relatively movable parts. The two relatively movable parts, including a shouldered piston core and a ring-like piston member, are contained and housed wholly within the casing and are suitably disposed relative valve ports in the casing and valve control means on the piston core between the ring-like member and one end of the piston core, whereby a self-centering position of the piston is effected and a substantial balancing of pressures is effected, when the opposite ends of the piston present portions of different area within the ends of the valve cylinder and such end portions of the cylinder are simultaneously subjected to, or maintained under, pressure.

A further object is to provide a fluid actuated main control valve, which control valve may in turn be controlled either manually or automatically by a main pilot valve, the main control valve being one which is of simple structure and may be readily moved, the main casing providing a cylinder portion extending throughout the length of the casing and being open at opposite ends thereof and being of uniform bore or size, excepting at one end, which presents an enlarged portion forming a shouldered portion for coaction with the piston to effect the self-centering and balanced pressure features, as is herein more fully described. The piston, likewise, may be readily and economically made and assembled for use, and while such piston may be composed of a number of component parts for effecting pressure balances, and a suitable disposition of such parts on the piston to effect proper control of the high pressure fluid to the various inlet and outlet ports, many of such parts are similar in form and arrangement, such, for example, as the packing rings and spacing sleeves, so that in reality they do not add to the complexity of the structure as they are in use, assembled and bolted together so that the piston has all the simplicity of a single piece.

One preferred form or selected embodiment of the invention is shown in the accompanying drawings for purposes of illustration, it being understood that various changes and modifications in structure and detail may be made by those skilled in the art, without substantially departing from the spirit of the invention.

Figure 3 is a longitudinal section through the valve showing the position of the parts and various ports, when the piston of the valve has been moved in the opposite direction or limit of travel, namely, through the right, under which conditions the pilot valve is so disposed as to permit the duct leading to the right end of the cylinder to communicate with the exhaust port, so as to relieve the pressure at that point, and to permit liquid under pressure from the pilot valve to be conducted to the left end of the cylinder as indicated by the arrow, in order to effect movement of the piston to the right and to occupy the position there shown in order to effect a reversal in the direction of the high pressure fluid conducted to and from the hydraulic manipulator mechanism, the reverse relative direction of such liquid being indicated by the arrows.

Figures 1, 2, 8:
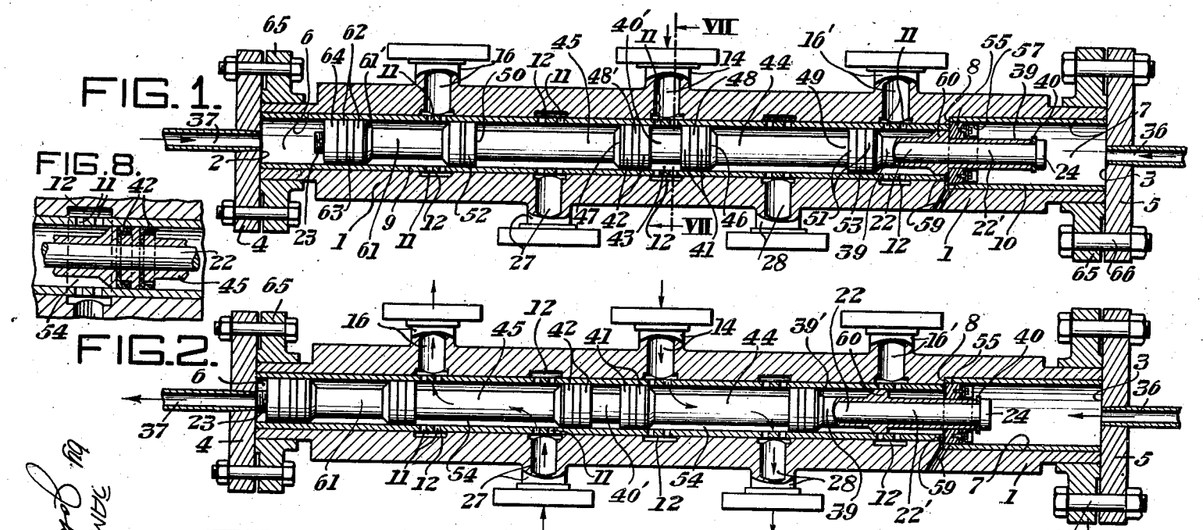
Figure 1 is a longitudinal section of the main control valve showing the piston in a central or centered position in which the ends of the piston disposed in the opposite ends of the cylinder are simultaneously subjected to pressure, preferably, although not necessarily, of incompressible liquid or medium such as water. In such central position the packing rings on the piston are so disposed relative the various inlet and outlet ports between the valve and the pilot valve and between the valve and the actuating cylinder or piston for the manipulator at the blooming mill.
Figure 2 is a longitudinal section of the valve showing the piston at one limit of travel, to the left as shown herein, wherein the pressure is admitted in the valve cylinder at the right end, and the left end of the cylinder as a duct communicating with an exhaust or outlet port, whereby the pressure is relieved in the left end of the cylinder to permit movement of the piston to the left limit of travel. Such movement of the piston permits interconnection of the inlet and outlet ports to and from the pilot valve and to and from the hydraulic manipulator actuating means respectively, so as to effect movement in one direction.
Figure 8 is a fragmentary view in section showing a portion of the piston, and more particularly showing the arrangement of the packing rings and a washer therebetween, and further shows the manner in which the assembly and grouping of these various packing rings and washers are held fixed between the ends of the tubular sleeve-like members which are telescoped upon the piston core.
Figure 3:
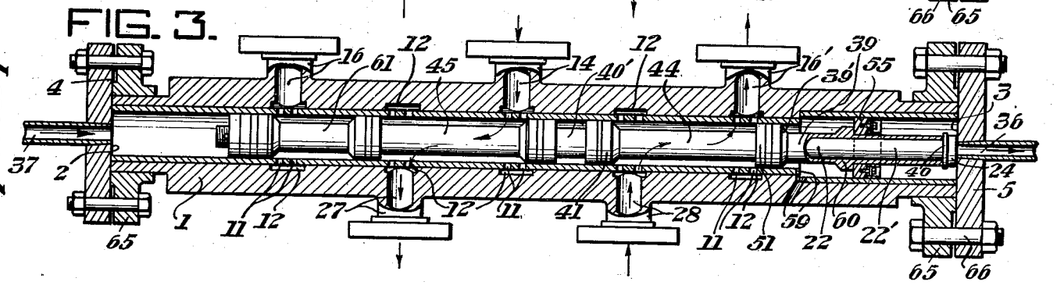

As shown in Figures 1 to 3 illustrating a preferred selected embodiment of one form of liquid actuated manipulator control valve, the structure of such control valve is shown as including a casing designated generally as 1 which preferably may be of elongated cylindrical form and is provided with a bore portion designated generally as 1' extending throughout the length of the casing, forming a hollow cylindrical or tubular-like member which is open at each end forming, respectively, open ends 2, 3, which ends are shown as being closed or sealed by end caps or plates 4, 5. Such an arrangement and construction of the casing as above indicated in a preferred embodiment forms a casing tubular-like in form and may be under some circumstances readily adapted for manufacture or fabrication by methods such as are employed in tubular or cylindrical objects, such, for example, as by piercing and rolling. It is, of course, understood that other methods of manufacture well known to those skilled in the art may be employed in forming the valve casing and other associated parts hereinafter to be more fully described.

The actual bore portion of the casing is formed of two bore portions of different area or cross section. One bore portion 6 of smaller area or cross section extends from one open end of the casing 2 throughout the greater portion of the length of the casing 1 to a shouldered portion 8 of the bore, and an enlarged bore portion 7 extends from the shouldered bore portion 8 to the other open end 3. As will hereinafter more fully appear, the casing at various portions of the length of the bore portion 6 of reduced area is provided with various valve inlet and outlet ports 27 and 28 leading to and from a hydraulic manipulator actuating means 29 (see Figures 4 to 6, inclusive). As shown in these figures, the manipulator actuating means is shown diagrammatically as including a cylinder 29, a piston 30 and piston rod 31 connected therewith. Suitable liquid ducts or conduits 31, 32 are shown as extending from the inlet and outlet ports from the casing 1 to opposite ends of the cylinder 29 of the hydraulic manipulator actuating cylinder. Of course, the operation may be readily understood from the diagrammatic and schematic views 5 and 6 as being one in which the valve control mechanism within the casing 1 so controls the supply of fluid under pressure from a main inlet port 14 connected to a main source of supply of liquid under pressure, that for one direction of movement or travel of the piston 30 in the cylinder 31 the relative direction of flow of the liquid is as indicated by the arrows in Figure 5. Under these conditions the fluid is controlled by the valve control elements intermediate the length of the smaller bore portion 6 of the casing, so that the liquid passes from the inlet port 14 connected to the main source of fluid supply under pressure to the inlet port 28 and through the conduit 32 leading to the lower side of the piston 30, thus tending to move the piston in one direction, that is, upward as shown in Figure 5; at the same time an outlet or exhaust connection is formed between an outlet or exhaust port 16 leading from and through the small bore portion 6 of the valve control casing 1, through the exhaust or outlet port 27, which is in turn connected through the conduit 31 with the chamber on the upper or opposite side of the piston 30 within the cylinder 29.

To effect movement of the piston 30 of the manipulator actuating means in the opposite direction, a valve control means (hereinafter more fully described) within the cylinder casing 1 intermediate the length of the small bore portion thereof is so moved and disposed as to reverse the direction of flow of the fluid in the ducts 31, 32 in a manner as indicated by the arrows in Figure 6. As thus shown, the fluid under pressure is applied to the cylinder chamber on the upper side of the piston 30 within the cylinder 29, so that the piston is forced downward and in a direction of movement indicated in Figure 6, and the fluid is forced outward through the port 28 (which port under conditions indicated in Figure 5 serves as an inlet port leading to the manipulator actuator, but which port now serves as an exhaust port, under conditions indicated in Figure 6) to a main exhaust port 16'. The particular arrangement and further details with reference to the valve control means within the valve casing, the relation of the bores of different areas within the casing, and the relation of the various areas of the different portions of the piston core, for effecting control of movement of either the valve control parts in the casing, or the manipulator control means in either direction, or, for maintaining them in a neutral or central position, will hereinafter be more fully considered.

While reference has been made to the cylinder 29 as the actuator for manipulator mechanism for slabbing and blooming rolling mills, it is clear that such a hydraulic actuating means may be adapted to and employed for other purposes and uses, by employing suitable adapting and connecting means of various types well known in the art for transmitting movement from the piston. Such particular adapting means are not herein more fully considered as they form no part of the present invention, which is directed more particularly to the means for effecting control of the movement of the hydraulic power actuating means.

Figure 4:
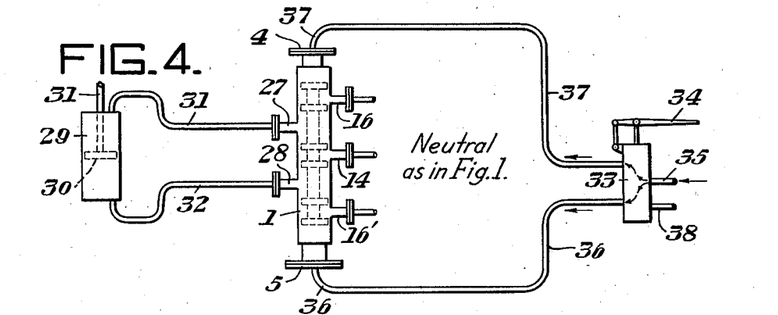
Figure 4 is a diagrammatic view showing the pilot valve, of a known conventional type, such for example, as that illustrated in Figure 2 of Patent No. 767,732, and also described therein, the main control valve which is fluid controlled from and by the pilot valve, and a hydraulic manipulator mechanism diagrammatically represented by a cylinder and piston, together with connecting conduits or ducts illustrating the position of parts, and the relative direction of the transmission of, or maintenance of, pressure in the ends of the cylinder of the main valve, when the valve parts are in neutral position as shown in Figure 1.
Figure 5:
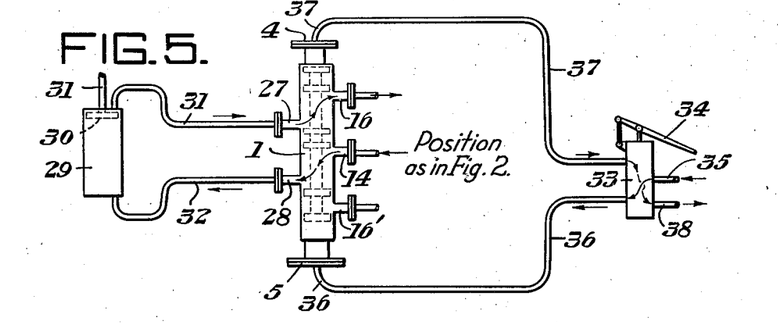
Figure 5 is a diagrammatic view similar to Figure 4 but showing the changed relative position of the parts, such as the pilot valve, the piston of the main valve, and the piston of the manipulator actuating mechanism, when the parts of the valve are in the position as shown in Figure 2, wherein the piston of the main valve is shown at one limit of travel to the left which corresponds to the position shown in Figure 5, wherein the piston is in the upper limits of travel.
Figures 6, 7:
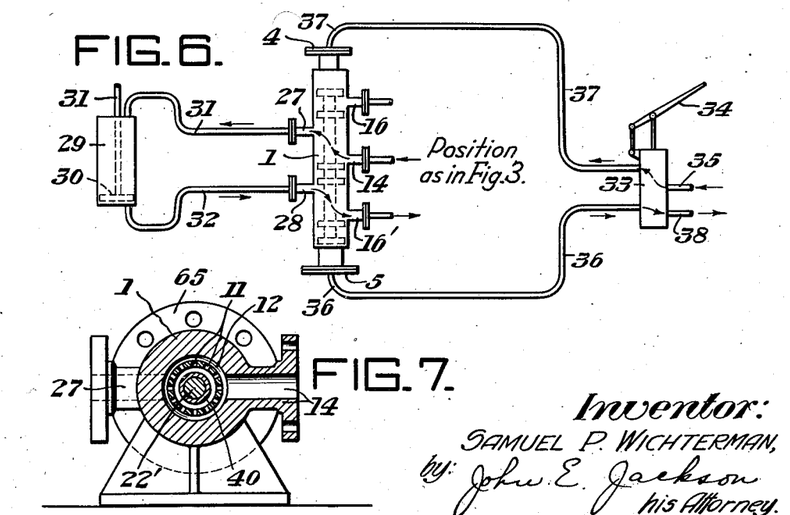
Figure 6 is a diagrammatic view similar to Figures 4 and 5, excepting that the pilot valve has been moved in the opposite direction to effect fluid actuation of the piston of the main valve to the opposite limit of travel so as to, in turn, effect movement of the piston of the hydraulic manipulator means in the opposite direction, so that as shown in Figure 6 the parts will correspond to the position of the valve parts as shown in Figure 3.
Figure 7 is a view partly in section and taken on the line VII—VII of Figure 1, transversely of the valve, and looking in the direction of the arrows.

While considering Figures 5 and 6 it might be well to note at this point the general character of the control element for regulating and controlling the movement of the control valve parts within the casing 1. As shown in Figures 4 to 6 which are more or less diagrammatic in form, the main master control for the movement of the manipulator actuating mechanism is shown as comprising a well-known conventional and commercial type of pilot valve designated generally as 33, and may be of a type such as that illustrated and identified as C in Figure 2 of Patent No. 767,732, and described therein, and which is shown as being of the manually actuated type, but it is understood that if desired such pilot valve itself may in turn be controlled automatically by various control means to serve as a master automatic fluid control without the necessity for use of exposed movable mechanical elements.

As shown in Figure 5, the pivoted handle 34 of the pilot valve has been moved downward to effect initial application of the fluid pressures and the flow thereof in the direction as indicated by the arrows. As shown, the fluid pressure at the inlet conduit 35 leading to the pilot valve is applied through the suitably disposed port and valve connections within the pilot valve, so as to be applied to the conduit 36 leading to the end plate or cap 5 at one end of the casing 1, which in turn leads to the enlarged bore portion 7 at one end of the casing. The position of the parts within the casing 1, as shown in Figure 2, will correspond to the position assumed by the valve control parts for conditions as indicated in Figure 5. The conduit 37 connects the bore portion of reduced area 6 in the other end of the casing 1 with an exhaust or outlet duct 38 as indicated by the arrows indicating the direction of flow of the fluid when the pilot valve is in the position as indicated in Figure 5. It is to be understood in effecting control of the fluid pressure through the pilot valve that the flow of the liquid is not a continuous one, but that the purpose of the pilot valve is primarily to exert an initial fluid pressure upon valve control parts within the casing 1 to effect a directional control in the movement of the manipulator actuating mechanism. The connection of one end of the conduit 37 with the end plate or cap 4, as shown in Figure 2, will effect a connection with the reduced bore portion 6 as above indicated.

The diagrammatic showing of the relative direction of fluid and of the relative position of the parts as indicated in Figure 6 would correspond to the detailed showing of the relative position of the parts of the control valves within the casing 1, as shown in Figure 3. Referrring to Figure 6, the pilot valve handle 34 is shown in a raised position in order to effect a reversal in the relative direction of the fluid pressure applied to the main control valve casing 1. As herein shown, the pressure from the inlet duct 35 is transmitted through the pilot valve to the conduit 37 leading to the end plate 4 of the control valve. At the same time, the bore in the opposite end of the casing 1 is connected with the outlet or exhaust port 38 through the conduit 36, one end of which is connected with and passes through the end plate 5 so as to be in communication with the bore portion 7 of enlarged area at one end of the casing 1. Of course, there will be an actual movement or flow of the liquid through the outlet or exhaust conduits 36 and 38 (Figure 6) only during the movement of the valve control parts on the piston core movable within the casing 1, from one position to the other, to effect the desired control of the manipulator actuating mechanism.

As shown in Figure 4, the pilot valve handle 34 is in a central or neutral position and corresponds to a relative position of the parts of the control valve within the casing 1, as shown in sectional detail in Figure 1. As shown in Figure 4 and as indicated by the direction of the arrows at the pilot valve 33, the port arrangement within the pilot valve is such as to initially subject both of the conduits 36 and 37 to the supply source of fluid pressure at the inlet port 35, and such an arrangement seals each of the conduits 36, 37 from communication with the exhaust or outlet conduit 38. Of course, this initial fluid pressure simultaneously applied to the bore portions 6, 7 in opposite ends of the casing 1 serves, through the unique and novel arrangement of the valve piston, slidable piston ring and associated valve parts (hereinafter to be more fully considered), to enable the control parts and ports within the casing to be brought to a centralized or neutral position in which the flow of the fluid through the conduits 31, 32 leading to the manipulator mechanism is interrupted so as to prevent further movement of the piston 30 within the cylinder 29. As shown in Figure 4, the movement of the piston 30 has been arrested midway between the ends of the cylinder 29. By proper manipulation of the pilot valve handle 34, the movement of the piston 30 may be controlled throughout its limit of movement within the cylinder 29. Of course, with reference to the showing in Figure 4, in which the liquid pressure from the inlet port 35 is simultaneously applied to the bore portions 6, 7 of different areas, at opposite ends of the casing 1, it is understood that it is only necessary that such simultaneous pressure be applied until the movement of the parts within the casing 1 have been brought to a neutral or centralized position, after which, if desired, instead of positively maintaining a connection with the fluid pressure at the inlet port 35, it would merely be necessary to prevent escape of the fluid through either of the conduits 36 and 37, in order to maintain the liquid fluid in such conduits and also in the bores 6, 7 in the opposite ends of the casing 1. Under such latter conditions, further movement of the parts within the casing would be precluded because of the incompressibility of the restricted or trapped fluid within the various parts and conduits to maintain the parts in neutral or central position.

Referring more particularly to Figures 1 to 3, inclusive, the various bore portions of different area, designated generally as 6 for the bore portion of reduced area and 7 as the bore portion of larger area, are preferably provided with lining sleeves or bushings 9 and 10. The lining sleeve or bushing 9, extending throughout the length of the bore portion 6 of reduced area from the shouldered portion 8 to the outer end having the end cap 4 thereon, is provided with suitable apertures 11 which open into annular chambers designated as 12, the various annular chambers 12 being spaced at various points along the axis of the casing. The various annular chambers 12 are also in communication in turn with the various inlet and outlet ports 27, 28 leading to and from the opposite ends of the manipulator actuating cylinder 29 through the conduits 31 and 32 respectively; other annular chambers 12 spaced along the axis of the casing communicate with the inlet port 14, and the two exhaust ports 16 and 16'. Of course, it is clear that the openings 11, extending through the wall of the lining sleeve 9 around the circumference thereof in alignment with the annular chamber 12, serve as a channel or means through which the liquid may flow from the various inlet or outlet ports to the chamber between the outer surface of the piston core and the inner surface of the sleeve or lining 9. As will hereinafter more fully appear, the particular disposition of various packing washers on the piston core will determine the direction of flow of the fluid in the chamber portion between the outer surface of the piston core which is spaced from the inner surface of the sleeve lining or bushing 9. As will also hereinafter more fully appear, the arrangement of these various packing rings on the piston core is such that the fluid pressures on those packing rings intermediate the ends are balanced in such a manner as to minimize the tendency of the pressure of the fluid which is conducted to and from the manipulator actuating mechanism from being exerted upon the piston or packing rings within the casing in such a manner as to move the same in either direction. In any event, such latter pressure, that is, the pressure of the fluid being conducted to and from the manipulator work cylinder 29, is not relied upon as an actuating force for effecting movement of the piston within the casing 1, as is true of certain prior art devices.

The piston core and its associated parts as shown in Figures 1 to 3, inclusive, will now be more fully considered. As shown in these figures, the piston element includes a piston core designated generally as 22 and is more clearly shown in these figures in the broken sectional view at the right end of the casing 1. Considering Figure 2, the piston core is shown as being of a length slightly greater than the extent of the bore portion 6 of reduced area, said piston core having a portion designated generally as 22' which is continuously with the main piston core 22 and extends within the bore portion 7 of enlarged area. Preferably, the piston core is provided with a threaded portion 23 at one end and a capped or flanged portion 24 at the other end. The cap 24, presenting a shouldered or flanged portion at the end of the piston core 22', serves as a preferable and convenient means of positioning one end of a series of tubular sleeve-like members which telescopingly are slid or fed upon the piston core from the threaded end 23, so that the end tubular member 39 abuts against a washer 40, which in turn abuts against the flanged portion of the cap 24, which serves as a stop for a series of tubular-like sleeve members which are slid upon the piston core 22 throughout the length thereof. Disposed at various portions of the length of the piston core 22, which at times is wholly within the bore section 6 of smaller area or cross section, are means on said piston core 22 associated with the various telescoping tubular sleeve-like members which cooperate with the various inlet and outlet ports to control the fluid pressure and direction of the flow thereof from the main inlet port 14 to either of the ports 27, 28 to determine which of said ports leading to the cylinder 29 of the manipulator actuating mechanism will serves as the inlet port communicating with said main inlet port 14 which communicates directly with the main source of fluid pressure and supply. Whether either one of the ports 27 or 28 leading to the manipulator actuating cylinder 29 functions as an inlet port to the cylinder 29 will depend upon whether the piston core 22 has been moved toward either one end or the other of the casing 1 by being guided within the sleeve lining or bushing 9 within the bore 6 of reduced area. Suitable valve control means are mounted on the piston core at suitable points spaced from each other and cooperate with the port openings to accomplish the above stated purpose or function of controlling the direction of flow and the application of pressure of the fluid from the intake port upon either one side or the other of the piston 30 within the cylinder 29 of the manipulator actuating mechanism. Stated generally, this cooperation and control of the fluid pressure is effected by controlling the movement of the piston core which is continuous and entirely contained within the bores 6 and 7 of different cross section within the casing 1, by controlling the movement of such piston core and the series of tubular-like sleeve members thereon, so that said piston core 22 is moved either in one direction or an opposite direction from a neutral or central position within the bores 6, 7 of the casing 1.

Referring now more particularly to the tubular sleeve-like members on the piston core, together with the valve control means thereon cooperating with the outlet ports, as shown in the preferred construction in Figures 1 to 3, inclusive, a central sleeve member 40' is disposed on the piston core 22 in substantial alignment with the inlet port 14; on opposite ends of the centrally disposed sleeve 40' are disposed packing washers or cups 41, 42 respectively. The packing cups are, of course, of a diameter larger than the diameter of the tubular sleeve 40', so as to form an annular chamber 43 between the outer surface of the sleeve 40' and the inner surface of the lining bushing 9 in order that the fluid may pass from the annular chamber 12 in communication with the inlet port 14 through the openings or apertures 11 in the bushing or lining 9 of the bore of reduced diameter. Two other tubular-like sleeve members 44 and 45 respectively are disposed on the piston core 22, one on each side of the central tubular sleeve 40'. Preferably, at one end of the sleeve is an outwardly flaring or tapered portion which forms a shoulder 46, 47 on the sleeves 44 and 45 respectively. Such shouldered portions 46, 47 abut against the packing washers 41, 42, respectively, and serve to maintain a seal and tight joint between the packing washers 41 and 42 respectively and the inner face of the lining 9 as the piston core 22 is moved in either one direction or the other. It is to be noted that the packing washer may slide freely past the ports 14 without the danger or likelihood of the packing being defaced or injured, as might be the case if the surface of the packing were required to be moved past a continuous edge or shoulder at the port which extended circumferentially about and within the bore of the casing. In this respect, the spaced apertures 11, extending circumferentially about the bushing lining 9, serve as a convenient and desirable means of permitting flow of the fluid and at the same time presenting a substantially continuous surface at said points in order that the face of the packing cups 41, 42 may slide or ride thereover without injury to the packing. Preferably, metal rings or washers 48, 48' of an L section are disposed on the piston core between the two packing rings or portions which comprise each of the packings 41 and 42 respectively (see Figure 8). Preferably, the opposite ends 49 and 50 of the tubular sleeve-like members 44, 45 are not provided with the outwardly flaring or tapered flanged or shouldered portions such as 46, 47, but are of a smaller diameter or provided with a slight flanged or shouldered portion so as to fit within the cup portion of the packing rings 51, 52, and to serve as a backing for the radially extending or annular portion of the packing cup, the opposite side of which annular portion is backed up or engaged by another metal washer or ring 53 similar to the metal ring 48 previously referred to. With reference to the disposition and location of the packing washers 51, 52 at the opposite ends of the tubular sleeve-like members 44, 45, it is noted that the length of such sleeve-like members 44, 45 determining the location of the packing washers 51, 52 is such that the latter washers are disposed adjacent and just to one side of the outlet or exhaust ports 16, 16', so that when the piston core 22 has been moved to the left and the various parts are in the position as indicated in Figure 2, the direction of flow of the fluid will be as indicated by the arrows, wherein the fluid enters the inlet port 14, passes through the apertures 11 in the lining bushing 9 to the annular chamber 54 between the inner face of the bushing 9 and the outer circumference of the tubular sleeve 44 and passes out the port 28 which now serves as an inlet port leading to the cylinder 28 through the duct 32 to the cylinder chamber or one side of the piston 30. See also Figure 5 which diagrammatically indicates the path followed by the flow of liquid from the main inlet valve to the cylinder of the manipulator actuating device, when the valve parts are in the position as indicated in Figure 2. The return flow of the fluid from the opposite side of the piston 30 whereby the fluid is conducted through the exhaust port 16 is indicated by the arrows in Figure 2 and Figure 5; the return flow of the fluid through the exhaust is also indicated by arrows in these two figures. For example, in Figure 5 the position of the piston 30 is shown at the end of its travel to one end of the cylinder 29 and up to such point of travel the fluid would be conducted through the duct 31 to the return port 27, through the various apertures 11 and annular chamber 54 within the piston core and the bore lining and finally to the exhaust port 16.

One of the features of a valve construction as herein disclosed is that for the neutral or central position of the valve for either of the other two positions of the valve core, when it is moved either to the right or left of the neutral or central position, opposite sides of the various valve packings on the piston core, particularly those packing rings which are disposed on the core intermediate or between the ends thereof, are without effect in having any substantial tendency to move the piston core in either one direction or the other; in any event, it is not intended and no reliance is placed upon the pressure from the main inlet port during the flow of liquid to and from the manipulator actuating cylinder for effecting movement of the piston core in either one direction or the other. This is in distinguishing contrast to certain prior art devices. Further, the arrangement is such that the pressures on opposite sides of the packing rings are substantially the same and are thus substantially balanced. Such an arrangement minimizes the likelihood of any leakage through the packing rings on the piston core intermediate the ends thereof.

As illustrative of the manner in which the pressure from the main fluid inlet port is exerted on the piston core equally and in opposite direction, reference might be made to the position of the valve parts when the piston core is in a neutral position as indicated in Figure 1. In such neutral or central position of the piston core 22, the fluid pressure from the main inlet port 14 is exerted upon the piston core by being transmitted through the annular chamber 12, through the apertures 11 to the annular chamber 43 between the central sleeve 40 and the bore lining bushing 9. It is clear from this arrangement and disposition of parts that the fluid pressure would be exerted against the packing rings 41, 42 arranged and disposed on opposite sides of the axis of the inlet port 14, so that a pressure would be exerted along the axis of the piston core through contact of the liquid with the packing rings 41 and 42; this pressure would be equal and in opposite directions axially of the axis core and thus would tend to be balanced, and such balanced pressures from the inlet port would be ineffective as having any tendency to move the piston core axially in either one direction or the other.

Substantially the same conditions of balanced pressure would exist in the control valve parts for the position of the parts as indicated in Figure 2 wherein the piston rod has been moved to the left to one limit of travel. However, in such position the balanced pressure would exist between the two annular chambers surrounding the tubular sleeve-like spacing members on the piston core, which extend between the port 28 leading to the inlet side of the manipulator actuating cylinder 29 and the inlet port 14 leading to the casing, the other tubular-like spacing sleeve 45 extending between the return or exhaust port 27 and the exhaust port 16 for the position of the part as indicated in Figure 2.

The same balanced condition exists, as above set forth, when the piston core has been moved to the right limit of travel, as shown in Figure 3, wherein the tubular sleeve 44 spaces the packing washers 51 and one of the packing washers 41 axially of the piston core so that the fluid, as shown in Figure 3, is conducted from the exhaust port 28 leading from the exhaust side of the cylinder 29 through the duct 32 to exhaust port 28 in the valve casing, and from such port through the annular chambers of the casing and surrounding the piston core to the exhaust port 16'. Still considering Figure 3, the fluid from the intake port 14 would be conducted through the various annular chambers within the casing and surrounding the piston core to the inlet port 27 as indicated by the arrows in Figure 3 and from such port 27 the fluid would be conducted through conduit 31 to the intake side of the cylinder 29. It is to be noted that in all of these various positions of the piston core no reliance is placed upon either the pressure of the fluid or the force of the fluid flowing to and from the manipulator actuating cylinder for effecting movement of the piston core 22 in either one direction or the other. This feature is referred to as one in distinguishing contrast to other types of control valves employed in the prior art.

As shown in Figure 1, a continuous portion of the piston core 22 extends beyond the bore portion 6 of the casing having the smaller area and extends into the enlarged bore portion 7 of the casing, said enlarged bore portion having a lining sleeve or bushing 10 therein, as hereinbefore noted, extending from the shouldered portion 8 to the outer end of the casing 1 in the neutral portion of the piston core as indicated in Figure 1; the right end of the piston core, having the cap 24 providing flanges or stops at such point, extends into the bore portion 7 of enlarged area to a point about midway between the ends of such bore in a direction extending axially of the piston core. Under such conditions the end of the piston core will be moved to the extreme right end of the enlarged bore section 7 of enlarged area to a position as indicated in Figure 3 for one direction of movement and the end of the piston core will be moved to a position adjacent the opposite end of the bore portion 7 of enlarged area, that is, to the left as indicated in Figure 2.

One of the important features of the present valve control means is the simple but yet effective manner in which, where dealing with relatively high fluid pressures, the effective control of the movement of the manipulator actuating means which at times is required to manipulate and move loads weighing a number of tons is effected by a simple valve control structure having no movable or projecting parts extending through the casing so as to completely eliminate the necessity for the use of packing glands, which are usually required where a piston core or other movable part projects through or from a casing forming a cylinder or the like. As before indicated, the present device includes but two relatively movable parts, namely, a reciprocating piston core 22, together with its associated parts movable therewith, and a piston-like ring 55 which is slidable on the end of the piston core 22', formed as an extension or continuation of the main piston core 22, projecting into the bore portion of enlarged area 7. Considering the neutral or central position of the various parts of the valve control structure as shown in Figure 1, the relation between the various parts is such that the continuous extended portion 22' of the piston core is such that the end or cap portion 24 at the end of the piston core is disposed substantially centrally of the bore portion of enlarged section 7 of the casing 1. In such position the ring-like piston 55 is shown abutted against the shoulder 8 formed in the casing between the two bore portions of different areas 6 and 7 respectively. Under conditions wherein the fluid pressure is admitted to the duct 36 so as to subject the bore portion 7 of enlarged area to the fluid pressure, the pressure of such fluid will be exerted against the outer face of the piston-like ring 55 which will slide along the piston core 22' until the inner face of such piston-like ring engages the shoulder 8. In Figures 1 to 3 said piston-like ring is shown in section as comprising a ring portion designated by reference character 55 which preferably is formed of metal, although other materials well known in the may be employed. A suitable packing 57 may be provided for the face of the ring looking toward the open end of the enlarged bore section 7, which face of the piston-like ring is in contact with the liquid within the bore portion 7 of enlarged area, so that the fluid that may be employed is prevented from leaking or escaping between the outer periphery of the piston-like ring 55 and the inner face or bore of the lining sleeve or bushing 10, or, from leaking of the liquid between the inner peripheral face of the piston-like ring 55 and the outer peripheral face of the piston core 22' on which the ring 55 slides. As shown a ring-type packing 57 may be employed and may be secured in position by suitable screws suitably spaced about the ring packing, which screws are shown secured into the metal ring 55. Flanged portions of the packing are formed at the inner and outer circumferences of the packing ring so as to form an annular packing which in section presents a general U shape. Of course, other equivalent forms and arrangement of packing may be employed.

As a means of avoiding the formation of any vacuum pockets upon the inner face of the piston-like ring when the ring 55 is moved from the central position indicated in Figure 1 where the ring 55 abuts against the shoulder 8 to a position to the right, as indicated in Figure 3, wherein the ring 55 is disposed substantially centrally of the bore portion 7 of enlarged area, when the piston core 22 has been moved to one limit of travel to the right, a venting duct or aperture 59 is formed which extends through the casing wall; the outer end of the venting duct 59 is in communication with atmospheric pressure and the inner end is so disposed as to open into the enlarged bore portion 7, preferably at the shoulder 8. Preferably, the duct 59 is so formed and disposed at its inner end as to also admit atmospheric pressure to the extreme right end of the bore portion 6 of reduced area, so as to prevent the formation of a vacuum or dead air pocket, to the left of the face of the piston-like ring 55, under conditions as shown in Figure 2 wherein the piston-like ring 55 abuts against the shoulder 8 and the piston core 22 is moved to an extreme position to the left, corresponding to one control position of the valve mechanism on the piston core between the shoulder portion 8 and the extreme left hand end of the piston core, such for example as the threaded end 23.

Another feature of prime importance, contributing toward the maintenance of the neutral or central position of the valve control packing rings on the piston core between the shouldered portion 8 at the casing and the extreme left end of the piston core which extends within the bore portion 6 of reduced area, is a shouldered portion 60 formed on the piston core at such a position that when the packing rings heretofore referred to are in a neutral or centered position to prevent the flow of fluid through the various inlet and exhaust ports within the casing, said shouldered portion 60 on the piston core 22 will abut against the inner face of the piston-like ring 55. A portion of said inner face of the ring 55 is at the same time in abutting relation with the shouldered portion 8 which is formed in the casing at the adjacent inner ends of the bore portions 6 and 7 respectively. With such a construction, when liquid pressure is simultaneously admitted to the ducts 36 and 37 to the bore portions 7 and 6 respectively so that the ends of the piston core within said bores are subjected to the liquid pressures, the outer face of the piston-like ring 55 also being subjected to the liquid pressure within the enlarged bore portion 7, movement of the piston core will be effected, either from a position as indicated in Figure 2, the one limit of movement to the left, or from a position as indicated in Figure 3, where the piston core is shown in its limit of movement in the opposite direction to the right. But yet, as above stated when the bores in opposite ends of the casing are simultaneously subjected to fluid pressure, the effect will be in all cases to move the valve and port control packing rings mounted intermediate the ends of the piston core to a neutral or central position wherein the flow of fluid through the port openings will be cut off. Of course, after the valve parts have been brought to the neutral or central position, it is not absolutely essential that the fluid pressure from the intake port be kept or maintained within the bore portions 6, 7 at opposite ends of the casing, but it is essential that the incompressible fluid be retained in said bore portions 6, 7 in order to maintain the valve and port control means on the piston core in such neutral or central position.

Preferably, in order to obtain a structure with a shouldered portion such as 60 suitably disposed on the piston core 22 so as to function as a valve centering means in cooperation with the various other elements above considered, a tubular sleeve-like member 39 is formed in a manner somewhat similar to the other tubular sleeve-like members 44, 45 hereinbefore referred to. Preferably the inner end of such a tubular sleeve-like member 39 may be provided with an outwardly flared or tapering shouldered or flanged portion 39' which may serve as a backing for one of the packing rings 51, heretofore referred to. As shown the packing washer 53 is slidably disposed on the piston core 22 so as to occupy a position between the packing rings or washers 51 as hereinbefore referred to.

One of the advantages of a structure employing a plurality of tubular sleeve-like members, such as the tubular members herein identified by reference characters 45, 44 and 39, and also the tubular sleeve-like member 61, disposed on the left hand end of the piston core, is that it enables a simple and composite piston structure to be formed merely by the assembly of a number of parts which may be readily slid or telescoped upon the piston core, all in their proper relation so as to dispose the various packing washers at the proper points intermediate the ends of the piston core so that they may function to control the flow of the fluid to and from the various ports leading to and from the valve casing. All of said parts may be securely retained in position by screwing the threaded packing nut 64 upon the threaded portion 23 at the left hand end of the piston core 22. A further advantage of such an assembled composite structure is that any one or more of the various packing washers or rings may be replaced if and when required.

The valve and port control elements mounted on the piston core 22 between the shouldered portion 60 and the opposite threaded end 23 of the piston core are retained in a neutral or central position relative to various inlet and outlet ports in the casing, primarily because of the utilization of a plurality of bore portions 6, 7 in the casing of different areas in cross section, presenting a shouldered portion 8 therebetween, and also because of the relative arrangement of the piston ring-like member 55 which is movable or slidable upon the end of the continuous core 22' which extends into the larger bore portion, said piston-like ring acting in cooperation with the shouldered core portion 60 and the shoulder 8. It will be noted that the area at the extreme right hand of the piston core 22 represented generally by the area of the end cap 24, which is subjected to the pressure of the fluid in the bore portion 7, is less than the sectional area of the piston core at the opposite left end of the piston core adjacent the threaded end portion 23, which is subjected to the fluid pressure in the bore portion 6 of a casing. Considering these forces alone, the tendency would be to move the piston toward the right where the fluid pressures are equal in the two bore chambers 6, 7 respectively. However, the diameter of the piston-like ring 55 corresponds substantially with the diameter of the bore portion 7 which has a larger area, taken transversely of the piston axis, than the sectional area of bore portion 6; therefore, the fluid pressure within the bore 7 when the same as the fluid pressure in bore portion 6 would act upon the face of the piston-like ring 55 and the end cap 24 of the piston core 22; and would move the piston-like ring 55 together with the piston core 22 to the left within the bore portion 7 until the piston-like ring 55 engaged the shoulder 8, which would serve as a stop to prevent further movement in that direction. Considering the relative position of the parts as shown in Figure 3, if the liquid fluid were simultaneously admitted in the end bore sections 6, 7 of the casing so that the fluid would be entering the ducts 36, 37 in a direction as indicated by the arrows in Figure 1, the fluid pressure in each of the respective bores would be exerted on opposite ends of the piston core. If these were the only forces effective to control the movement of the piston, the piston core would be moved toward the right, because of the larger section of the piston at the left end thereof adjacent the threaded portion 23 which would be subjected to the liquid pressure, bearing in mind that the cross sectional area of the piston core capped end 24 within the bore portion 7, is less than the cross sectional area of the piston at the extreme left hand portion above referred to. However, as is clear from Figure 3 the piston-like ring member 55 is shown abutting against the shouldered portion 60 which is rigid with the piston core 22, so that the total area exposed to the liquid pressure within the enlarged bore portion 7 would include the area of the right end of the piston core at the capped portion 24, plus the area of the piston-like ring member 55, so that this combined area would be greater than the sectional area of the piston at the extreme left end thereof which would be subjected to the liquid pressure within the bore portion 6. As shown in Figure 3, the shoulder portion 60, rigid with the piston core 22 abutting against the piston-like ring member 55, is disposed substantially centrally intermediate or between the ends of the axis of the enlarged bore portion 7, so that the greater resultant pressure effective upon the combined areas of the end of the piston core 24 and upon the piston-like ring member 55, would be effective to move the piston core, together with the valve and port control elements mounted intermediate the ends of the core, to the left to a central or neutral position which would be represented by the relative relation of the parts as shown in Figure 1. Further movement would be arrested or prevented when the piston-like ring member 55 engages or abuts against the shoulder 8. In this position further movement of the piston core in either one direction or the other would be prevented and precluded even though there existed a difference in the pressures effective upon opposite ends of the piston core. As previously stated the relative position of the various parts as indicated in Figure 1 would represent a position in which the valve control ports were in a neutral or centralized position relative the various inlet and outlet ports leading to and from the casing.

It has previously been noted that movement of the piston core either to the left or right is effected through a pilot valve control, either by movement of the pilot valve handle 34 downward to a position indicated in Figure 5, or upward to a position indicated in Figure 6, the relative pressures effective in the end bore sections 6, 7, as shown in Figure 5, respectively, would be changed by reducing the pressure in the bore section 6 of reduced diameter by connecting the conduit 37 with the exhaust or outlet port 38, and at the same time the bore portion of enlarged sectional area 7 would be connected with the inlet port 35 through the duct 36. To effect movement of the piston core 22 and the valve control members thereon to the right as shown in Figures 3 and 6, or in the opposite direction to that above referred to in considering Figures 2 and 5, the handle 34 of the pilot control valve would be moved upward so that the pressure to which the fluid within the bore 7 is subjected is reduced by connecting the conduit 36 with the exhaust port 38 as indicated in Figure 6. At the same time the upward movement of the pilot valve handle 34 would connect the inlet port 35 with the conduit 37 so that the fluid would pass into the bore chamber 6 at the fluid pressure of the inlet port, so that the piston core would be moved to the extreme right hand position as indicated in Figure 3.

It is to be noted that the vent port 59 serves a useful function in facilitating the free movement of the piston-like ring member 55 to the right to a position indicated in Figure 3 from a central position as indicated in Figure 1. Also, the vent passage 59 as heretofore stated is in communication with the extreme right hand end of the bore section 6 of reduced area, at the point at which it opens into the bore section 7 of enlarged area at the shoulder 8. By reason of this detail of construction the vent passage 59 also functions to facilitate the free and unimpeded movement of the shouldered portion 60 from a position indicated in Figure 1 to a position during movement to the left as indicated in Figure 2, during that portion of such movement up to the point until the shouldered portion 60 is in alignment with the opening or apertures 11 in the lining sleeve, which apertures 11 would then be in communication with the exhaust port 16'. Of course, the reason why the movement of either the piston-like ring member 55 or the shouldered portion 60 on the piston core is facilitated by the vent passage is because of the fact that a vacuum is prevented from being formed by such movement of either of these two members. Conversely, the compression of either air, gas or leaking liquid is avoided. Of course, the duct 59 also serves to drain any liquid which may leak past the end packing rings.

As shown in Figures 1 to 3, the end plates or caps 4, 5 respectively may be retained in position on opposite ends of the casing by means of a ring flange 65 which may be secured or fixed on the end of the casing 1 in any suitable manner, such for example as by welding, a threaded connection or by any other suitable means well known to those skilled in the art. A simple bolt and nut connection 66 may be employed for securing the end plates or caps 4, 5 in position at the end of the casing 1.

While one preferred and selected embodiment of the invention has been shown and described herein, it is understood that various changes in detailed construction and the relation of certain of the parts may be made without departing from the spirit of the invention as hereinafter claimed.

I claim:

1. In manipulating control mechanism for slabbing and blooming rolling mills, adapted to be controlled by a pilot valve, a balanced self-centering hydraulically actuated control valve, having no external movable parts extending from the valve casing thus eliminating the necessity for use of external packing boxes or glands for effecting control of a hydraulic motor manipulator means, in either direction, said balanced control valve including a casing having a cylinder bore therethrough of uniform cross section for substantially the entire length thereof excepting a portion of the bore at one end, said end portion being of an enlarged area and forming a shouldered portion with the main reduced bore, said cylinder bore being open at each end of the casing, an end plate secured to the end of the casing having the enlarged bore and sealing the same, and second end plate secured to the opposite end of the casing having the smaller bore, and sealing the same, whereby the necessity for use of any packing glands and stuffing boxes for externally extending piston rods therethrough which may result in leakage is dispensed with, liquid ducts from control pilot valves leading to opposite ends of the bore to the smaller and the larger bore portions, respectively, a continuous piston core contained wholly within the casing, and extending throughout the length of the smaller bore portion of the cylinder casing, and extending into and terminating in the bore portion of enlarged area a short distance from the shoulder formed between the two bore portions of the casing of different areas, and said piston core having a shouldered portion fixed thereon in alignment with the shouldered portion of the bore when the piston core is in neutral or central position, the sectional area of the shouldered portion of the piston core being larger than the end portion of the piston core which extends into the enlarged bore at one end of the casing, and said sectional area of the shouldered portion and of the piston core being of substantially the same sectional area as the casing bore of smaller area at the other end of the casing, and the sectional area of the end of the continuous piston core extending into the enlarged bore and subject to the pressure therein, being less than the area of the other end of the piston area which is subjected to the pressure in the reduced bore at the other end of the casing, and valve mechanism including one pair of inlet and outlet ports, adapted to be in communication with opposite sides of a piston in a hydraulic work cylinder leading to and from a hydraulic work cylinder, and other ports including an inlet port and a pair of exhaust ports, said inlet port being connected with a source of fluid pressure, said valve mechanism being arranged and disposed in the casing, between the shouldered portion of the bore and the outer end of the small bore portion of the casing, and valve centering means mounted on the end of the piston core which extends into the bore of enlarged area at one end of the casing and adapted to slide thereon and abut against the shouldered portion of the casing bore when the valve mechanism is in self-centering position, and when both ends of the piston core wholly within the casing, and one side of the ring-like piston, are subject to the same pressure.

2. Manipulator control mechanism for slabbing and blooming rolling mills for effecting control of a hydraulic motor manipulator, as defined in claim 1 wherein said valve mechanism also includes direction control means for the manipulator piston disposed on the piston core between the shouldered portion of the piston core and the end of the continuous piston core in the reduced bore portion of the casing, said direction control means on the piston core including a plurality of packing washers disposed on the piston core in spaced relation and in such relation relative the inlets and exhaust ports in the casing that a substantially balanced fluid pressure is maintained relative the piston core and packing washers thereon for the different positions of the piston core, said valve centering means including a ring-like piston member being slidable on the end of the piston core, between the end thereof which extends within the enlarged bore portion of the casing, and the shouldered portion of the piston core, which is disposed in alignment with the shouldered portion of the two casing bores of different areas when the piston core and valve control is in neutral or central position, said slidable ring-like piston member being so disposed that the parts are in the central position under conditions wherein opposite ends of the piston core and one side of the ring-like member are simultaneously subjected to fluid pressure in the bores of different areas in opposite ends of the casing, the other side of said ring-like member engaging both the shouldered portion of the bore in the casing, and the shouldered portion of the piston core, whereby the position of valve port control means disposed on the piston core, between said shouldered portion of the piston core and the opposite end of the piston core, is controlled and determined by the relative fluid pressures in the bores of different area disposed in opposite ends of the casing effective on opposite ends of the piston of different area, and also effective upon one side of the ring-like member slidable on the extension of the piston core which extends into the enlarged bore at one end of the casing.

3. In manipulating control mechanism for slabbing and blooming rolling mills, adapted to be controlled by a pilot valve, a balanced self-centering hydraulically actuated control valve, having no external movable parts extending from the valve casing thus eliminating the necessity for use of external packing boxes or glands for effecting control of a hydraulic motor manipulator means, in either direction, including in combination a control pilot means, controlling the fluid pressure to said control valve, said balanced control valve including a casing having a cylinder bore therethrough of uniform cross section for substantially the entire length thereof excepting a portion of the bore at one end, said end portion being of an enlarged area and forming a shouldered portion with the main reduced bore, liquid ducts leading to opposite ends of the bore to the smaller and the larger bore portions, respectively, said pilot valve control, being arranged for simultaneously admitting fluid under pressure to the bores of different areas within and at opposite ends of the casing to place the valve mechanism of the casing in a central or neutral position, and said pilot valve control also being arranged to admit fluid pressure selectively to either one of the bores of different area at the ends of the casing, while simultaneously connecting the bore of different area at the opposite end of the casing to an exhaust lower pressure duct, and said balanced control valve including a continuous piston core contained wholly within the casing, and extending throughout the length of the smaller bore portion of the cylinder casing, and extending into and terminating in the bore portion of enlarged area a short distance from the shoulder formed between the two bore portions of the casing of different areas, and said piston core having a shouldered portion fixed thereon in alignment with the shouldered portion of the bore when the piston core is in neutral or central position, and valve mechanism including one pair of inlet and outlet ports, leading to and from a hydraulic work cylinder, and other ports including an inlet port and a pair of exhaust ports, said valve mechanism being arranged and disposed in the casing between the shouldered portion of the bore and the outer end of the small bore portion of the casing, said valve mechanism also including direction control means for the manipulator piston disposed on the piston core between the shouldered portion of the piston core and the end of the continuous piston core in the reduced bore portion of the casing, and valve centering means, mounted on the end of the piston core which extends into the bore of enlarged area at one end of the casing and adapted to slide thereon, said valve centering means including a ring-like piston member slidable on the end of the piston core which extends within the enlarged bore portion of the casing, and the shouldered portion of the piston core, said slidable ring-like piston member being so disposed that the parts are in the central position under conditions wherein opposite ends of the continuous piston core contained wholly within the casing and one side of the ring-like member are simultaneously subjected to fluid pressure in the bores of different areas in oppoiste ends of the casing, from the pilot valve control, the other side of said ring-like member engaging both the shouldered portion of the bore in the casing, and the shouldered portion of the piston core, and means to facilitate free movement of the said slidable ring-like piston in either direction, said means including a vent or duct extending through the wall of the casing, from a point at the inner duct end opening into the inner end of the enlarged bore, at a point near the shouldered portion of the bore whereby the opposite or inner side of the ring-like piston member is not subjected to fluid pressure but is subjected to reduced atmospheric pressure at all times throughout the movement of said ring-like piston between a centered position, to and from a limit of travel of the piston core toward one end of the casing, said shouldered portion of the piston core being disposed on said core substantially centrally of the bore portion of enlarged area, and being in engagement with the inner face of the ring-like piston member, when the opposite end of the piston core, in the bore of reduced area, is subjected to fluid pressure from the pilot valve, so as to actuate the valve control means carried by that portion of the piston core within the bore portion of reduced area, to connect the various valve control means, and inlet and exhaust ports to the hydraulic motor manipulator means, to effect movement thereof in one direction.

SAMUEL P. WICHTERMAN.